| United States Patent Office | 2,857,376 |
|---|---|
| | Patented Oct. 21, 1958 |

2,857,376

WATER-INSOLUBLE CRYSTALLINE STREPTOMYCIN AND DIHYDROSTREPTOMYCIN SALTS AND METHOD OF PURIFYING STREPTOMYCIN AND DIHYDROSTREPTOMYCIN BY MEANS THEREOF

Fritz Ziegler, Wuppertal-Elberfeld, Germany, assignor to Schenley Industries, Inc., New York, N. Y., a corporation of Delaware No Drawing. Application March 15, 1956
Serial No. 571,618

Claims priority, application Germany March 25, 1955

7 Claims. (Cl. 260—210)

This invention relates to new and useful water-insoluble crystalline salts of streptomycin and dihydrostreptomycin and to a procedure for purifying streptomycin and dihydrostreptomycin by means thereof.

Streptomycin and dihydrostreptomycin are known to form difficultly soluble salts with higher fatty acids, such as lauric acid and oleic acid, but these salts cannot be crystallized and therefore are difficult to obtain in pure state. They have, consequently, not found any pharmaceutical application.

It is further known that streptomycin and dihydrostreptomycin are capable of forming difficultly soluble compounds with certain dyestuffs, such as naphthol-blue-black, orange II, methyl-orange, etc., and with certain capillary active substances, which compounds have in part been proposed as intermediates in the purification of streptomycin. They have, however, been found to be unsuitable for pharmaceutical application.

It has now been found that crystallized salts of streptomycin and dihydrostreptomycin which are insoluble in water can be formed either by reacting streptomycin or dihydrostreptomycin salts with salts of diphenyl-4-monosulfonic acid or by reacting the free bases of these antibiotics with diphenyl-4-monosulfonic acid in solution or in suspension. The new salts thus obtained are insoluble or very difficultly soluble in cold water, very easily soluble in alcohols, and practically insoluble in acetone, dioxane and ligroin. The new salts may be recrystallized from hot water, from mixtures of alcohol and water or alcohol and acetone without any change in composition. They are of low toxicity and suitable for veterinary use since, in the form of parenteral preparations, they possess unusually protracted activity, a single injection of an aqueous suspension giving therapeutic blood levels in rabbits, dogs, calves and hogs of 50 hours and longer, which is 3–6 times as long as an equal injection of an aqueous solution of dihydrostreptomycin sulfate. The solubility characteristics of these new salts may also be employed to advantage in the recovery and purification of streptomycin and dihydrostreptomycin from their crude solutions. The products consist of 1 mol of streptomycin or dihydrostreptomycin and 3 mols of diphenyl-4-monosulfonic acid.

The invention is illustrated by the following non-limitative examples:

*Example 1*

15 grams of diphenyl-4-sodium monosulfonate are dissolved in 400 cc. of hot water. A solution of 13 grams of streptomycin sulfate in 80 cc. of water is added thereto. By rubbing with a glass rod, nuclei of crystallization are formed in the initially clear solution and the solution is left to cool with occasional stirring. After standing for some hours in the refrigerator, the crystal slurry obtained is filtered by suction, washed with ice cold water and then exsiccated. Yield: 20 grams. A small amount of the compound may be obtained by evaporating the mother liquor. It may, if desired, be further purified by recrystallization from hot water, methanol and water, or methanol and acetone.

*Example 2*

7 grams of dihydrostreptomycin sulfate are dissolved in 60–70 cc. of water. 7.5 grams of powdered sodium diphenyl-4-monosulfonate are added with stirring. The suspension obtained is heated on the water-bath for about 1 hour. Reaction occurs and the water-insoluble dihydrostreptomycin salt of the diphenyl-4-monosulfonic acid separates in mostly crystallized form while the sodium sulfate dissolves. Upon standing in the cold for some hours, the crystal slurry of fine needles is filtered by suction, thoroughly washed with ice cold water and dried in this exsiccator. Yield: 10–11 grams.

The analogous potassium salt of diphenyl-4-monosulfonic acid is described by Beilstein, vol. 11, p. 192. The sodium salt has the formula $NaC_{12}H_9O_3S \cdot 2H_2O$.

The recovery and purification of streptomycin and dihydrostreptomycin from crude or impure solutions thereof by means of the present invention are carried out in either of the following ways:

(a) Precipitating the insoluble streptomycin or dihydrostreptomycin salts of the acids by adding to the crude solutions concentrated solutions of water-soluble salts of the acid (if necessary heat saturated solutions or even suspensions), extracting the separated precipitates with methanol or ethanol, the desired streptomycin or dihydrostreptomycin salts being dissolved while precipitated impurities remain undissolved, converting the salts dissolved in methanol into the water-soluble mineral acid salts of the antibiotics by reacting, for instance, with dilute sulfuric acid and finally precipitating the sulfate of streptomycin or dihydrostreptomycin, if necessary by increasing the concentration of alcohol; e. g., 2.57 grams (1/500 mol) of the dihydrostreptomycin salt of diphenyl-4-monosulfonic acid were dissolved in 50 ml. of ethanol. To this solution there was added while stirring 7 ml. of $N-H_2SO_4$, whereupon a precipitate occurred at once. The precipitate was at first lumpy and became solid after the addition of a further 20 ml. of ethanol and could then be easily ground. After standing for two hours it was filtered by suction, washed with ethanol and dried in the exsiccator. The yield amounted to 1.10 grams of pure dihydrostreptomycin sulfate.

(b) Precipitating streptomycin or dihydrostreptomycin in the form of insoluble salts as described in (a), suspending or dissolving the crude precipitates in water insoluble alcohols like butanol, isobutanol or amyl alcohol, shaking with dilute sulfuric acid, separating the aqueous layer and precipitating the streptomycin or dihydrostreptomycin sulfate dissolved therein with methanol or ethanol; e. g., 2.57 grams of the dihydrostreptomycin salt of diphenyl-4-monosulfonic acid were suspended in a dropping funnel in 20 ml. of iso-butanol. 2.8 ml. (an excess) of $5N-H_2SO_4$ were added to this suspension together with 5 ml. of water. The whole was shaken for a few minutes whereupon all of the salt dissolved. The aqueous layer was then separated and the alcoholic layer shaken with another 5 ml. of water. The aqueous layers were combined, filtered and then so much methanol added that a turbidity appeared. After rubbing briefly with a glass rod a weak crystallized precipitate was obtained, which was strongly increased by gradually adding more methanol until its concentration was 85–90%. After standing for 2 hours in the cold, the precipitate was sucked off, washed with methanol and then dried in the exsiccator.

The yield amounted to 1.05 grams of dihydrostreptomycin sulfate.

I claim:
1. A water-insoluble crystallized salt of diphenyl-4-monosulfonic acid and a substance selected from the group consisting of streptomycin and dihydrostreptomycin.
2. A water-insoluble crystallized salt of diphenyl-4-monosulfonic acid and streptomycin.
3. A water-insoluble crystallized salt of diphenyl-4-monosulfonic acid and dihydrostreptomycin.
4. A suspension of a salt of claim 1 characterized by a duration of activity of 3-6 times that of an equal amount of dihydrostreptomycin sulfate.
5. A method for recovering and purifying a substance selected from the group consisting of streptomycin and dihydrostreptomycin from a crude solution thereof, which comprises adding to the crude solution of either of said substances a substance selected from the group consisting of diphenyl-4-monosulfonic acid and its salts, extracting with a lower alcohol the precipitate which separates, adding a mineral acid to the alcoholic extract to convert the dissolved salt to the corresponding mineral acid salt and precipitating the mineral acid salt by increasing the concentration of alcohol.
6. A method according to claim 5 in which the mineral acid is sulfuric acid and the lower alcohol is ethanol.
7. A method for recovering and purifying a substance selected from the group consisting of streptomycin and dihydrostreptomycin from a crude solution thereof, which comprises precipitating said substance with a member of the group consisting of diphenyl-4-monosulfonic acid and its salts, suspending the precipitate in a water-insoluble alcohol, shaking the alcoholic suspension with dilute sulfuric acid, separating the aqueous layer and precipitating the substance as sulfate.

References Cited in the file of this patent
UNITED STATES PATENTS

| | | |
|---|---|---|
| 1,865,776 | McCullough | July 5, 1932 |
| 2,644,816 | Lott et al. | July 7, 1953 |
| 2,650,216 | Carboni et al. | Aug. 25, 1953 |